United States Patent [19]

Copper

[11] Patent Number: 5,229,148
[45] Date of Patent: Jul. 20, 1993

[54] METHOD OF COMBINING ACTIVE INGREDIENTS WITH POLYVINYL ACETATES

[75] Inventor: Charles M. Copper, Westmont, Ill.

[73] Assignee: Wm. Wrigley Jr. Company, Chicago, Ill.

[21] Appl. No.: 839,392

[22] Filed: Feb. 20, 1992

Related U.S. Application Data

[63] Continuation-in-part of Ser. No. 809,468, Dec. 16, 1991, Pat. No. 5,198,251, which is a continuation-in-part of Ser. No. 781,006, Oct. 18, 1991, Pat. No. 5,165,994, which is a continuation-in-part of Ser. No. 606,044, Oct. 30, 1990, Pat. No. 5,108,762, which is a continuation-in-part of Ser. No. 340,384, Apr. 18, 1989, Pat. No. 4,978,537.

[51] Int. Cl.$^5$ .............................................. A23G 3/30
[52] U.S. Cl. ................................. 426/5; 426/502; 426/517; 426/519; 426/524; 425/372; 425/373
[58] Field of Search .................................. 426/3-6, 426/517, 502, 519, 524; 425/372, 373

[56] References Cited

U.S. PATENT DOCUMENTS

| | | | |
|---|---|---|---|
| 2,156,810 | 5/1939 | Garbutt | 426/517 |
| 2,224,430 | 12/1940 | Garbutt | 107/8 |
| 2,352,210 | 6/1944 | Kraft | 426/517 |
| 3,028,308 | 4/1962 | Zambito et al. | 167/82 |
| 3,201,353 | 8/1965 | Corben | 252/316 |
| 3,303,796 | 2/1967 | Novissimo | 426/517 |
| 3,329,574 | 7/1967 | Barron et al. | 167/82 |
| 3,435,110 | 3/1969 | Nichols | 424/20 |
| 3,737,521 | 6/1973 | Born | 424/22 |
| 3,795,744 | 3/1974 | Ogawa et al. | 426/3 |
| 3,818,107 | 6/1974 | Yolles | 426/3 |
| 3,923,939 | 12/1975 | Baker et al. | 264/49 |
| 3,928,633 | 12/1975 | Schoat et al. | 426/96 |
| 3,951,821 | 4/1976 | Davidson | 252/1 |
| 4,122,195 | 10/1978 | Bahoshy et al. | 426/3 |
| 4,125,519 | 11/1978 | Goodman et al. | 528/363 |
| 4,139,639 | 2/1979 | Bahoshy et al. | 426/3 |

(List continued on next page.)

FOREIGN PATENT DOCUMENTS

| | | |
|---|---|---|
| 0040048 | 11/1981 | European Pat. Off. . |
| 0191986 | 8/1986 | European Pat. Off. . |
| 0252374 | 1/1988 | European Pat. Off. . |
| 0253554 | 1/1988 | European Pat. Off. . |
| 0220103 | 2/1988 | European Pat. Off. . |
| 0263224 | 4/1988 | European Pat. Off. . |
| 0273009 | 6/1988 | European Pat. Off. . |
| 0288909 | 11/1988 | European Pat. Off. . |
| 0376549 | 7/1990 | European Pat. Off. . |
| 2503989 | 10/1982 | France . |
| WO85/03414 | 8/1985 | PCT Int'l Appl. . |
| WO88/08298 | 11/1988 | PCT Int'l Appl. . |
| WO89/02703 | 4/1989 | PCT Int'l Appl. . |
| 90/12511 | 11/1990 | PCT Int'l Appl. . |
| 1327761 | 8/1973 | United Kingdom . |

OTHER PUBLICATIONS

F. Billmeyer, Jr., *Textbook of Polymer Science*, 518-22 (Wiley International Edition, 2nd).

R. Dunn, D. Lewis, L. Beck, *Fibrous Polymers for the Delivery of Contraceptive Steroids to the Female Reproductive Tract*, Controlled Release of Pesticides and Pharmaceuticals, 125-46 (D. Lewis Ed. 1981).

*Primary Examiner*—Jeanette Hunter
*Attorney, Agent, or Firm*—Willian Brinks Olds Hofer Gilson & Lione

[57] ABSTRACT

An improved method of combining active ingredients with polyvinyl acetate for use in chewing gum results in significantly less degradation of the active ingredients. After the polyvinyl acetate and one or more active ingredients have been mixed together in an extruder, the mixture is extruded through a die to form a sheet-like extrudate. The sheet like extrudate is then cooled using a series of three chilled compression rolls. The extrudate is pinched between adjacent chilled compression rolls and both surfaces of the extrudate maintain contact with at least one of the chilled compression rolls for a period of time. The extrudate is thereby cooled swiftly and thoroughly, resulting in reduced degradation of the active ingredients.

29 Claims, 2 Drawing Sheets

U.S. PATENT DOCUMENTS

| | | | |
|---|---|---|---|
| 4,206,301 | 6/1980 | Yolles | 536/3 |
| 4,230,687 | 10/1980 | Sair et al. | 424/22 |
| 4,374,858 | 2/1983 | Glass et al. | 426/5 |
| 4,384,004 | 5/1983 | Cea et al. | 426/3 |
| 4,385,005 | 5/1983 | McSweeney | 426/250 |
| 4,386,106 | 5/1983 | Merritt et al. | 426/5 |
| 4,388,328 | 6/1983 | Glass | 426/3 |
| 4,447,475 | 5/1984 | Lubbock et al. | 427/213.31 |
| 4,485,118 | 11/1984 | Carroll et al. | 426/5 |
| 4,496,592 | 1/1985 | Kuwahara et al. | 426/5 |
| 4,515,769 | 5/1985 | Merritt et al. | 424/49 |
| 4,568,560 | 2/1986 | Schobel | 427/3 |
| 4,590,075 | 5/1986 | Wei et al. | 426/5 |
| 4,606,940 | 8/1986 | Frank et al. | 427/213.32 |
| 4,634,593 | 1/1987 | Stroz et al. | 426/5 |
| 4,673,565 | 6/1987 | DiLuccio et al. | 424/443 |
| 4,673,577 | 6/1987 | Patel | 426/5 |
| 4,690,825 | 9/1987 | Won | 424/501 |
| 4,695,463 | 9/1987 | Yang et al. | 424/440 |
| 4,711,784 | 12/1987 | Yang | 426/5 |
| 4,720,384 | 1/1988 | DiLuccio et al. | 424/78 |
| 4,722,845 | 2/1988 | Cherukuri et al. | 426/5 |
| 4,726,953 | 2/1988 | Carroll et al. | 426/5 |
| 4,740,376 | 4/1988 | Yang | 426/5 |
| 4,752,485 | 6/1988 | Sharma et al. | 426/99 |
| 4,766,036 | 8/1988 | Vaughn et al. | 428/364 |
| 4,816,265 | 3/1989 | Cherukuri et al. | 426/5 |
| 4,824,681 | 4/1989 | Schobel et al. | 426/5 |
| 4,828,857 | 5/1989 | Sharma et al. | 426/285 |
| 4,841,968 | 6/1989 | Dunn et al. | 128/335.5 |
| 4,873,085 | 10/1989 | Fuisz | 424/400 |
| 4,885,175 | 12/1989 | Zibell | 426/5 |
| 4,892,736 | 1/1990 | Goodson | 424/435 |
| 4,911,934 | 3/1990 | Yang et al. | 426/5 |
| 4,929,447 | 5/1990 | Yang | 424/440 |
| 4,933,190 | 6/1990 | Cherukuri et al. | 426/5 |
| 4,978,537 | 12/1990 | Song | 426/5 |

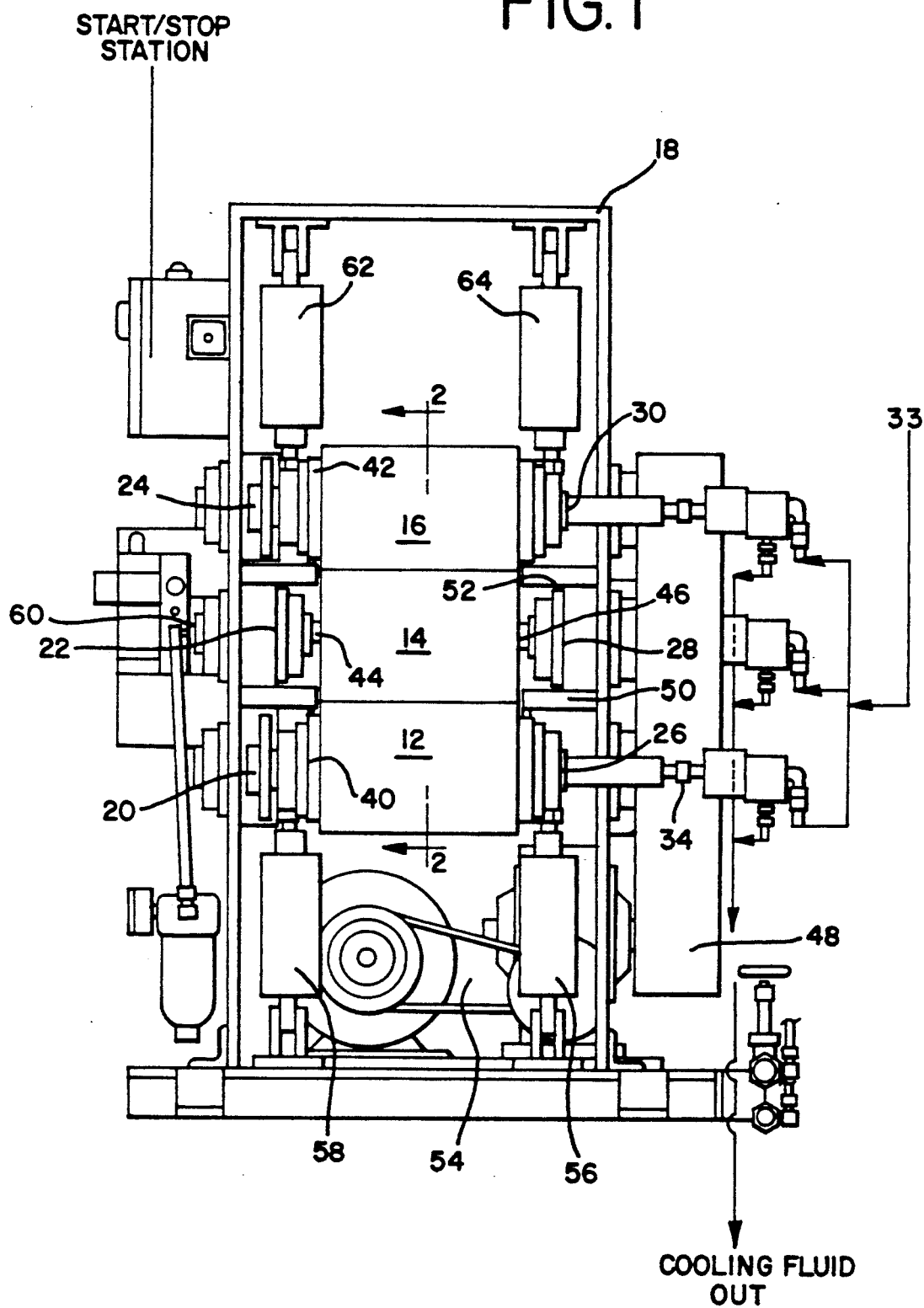

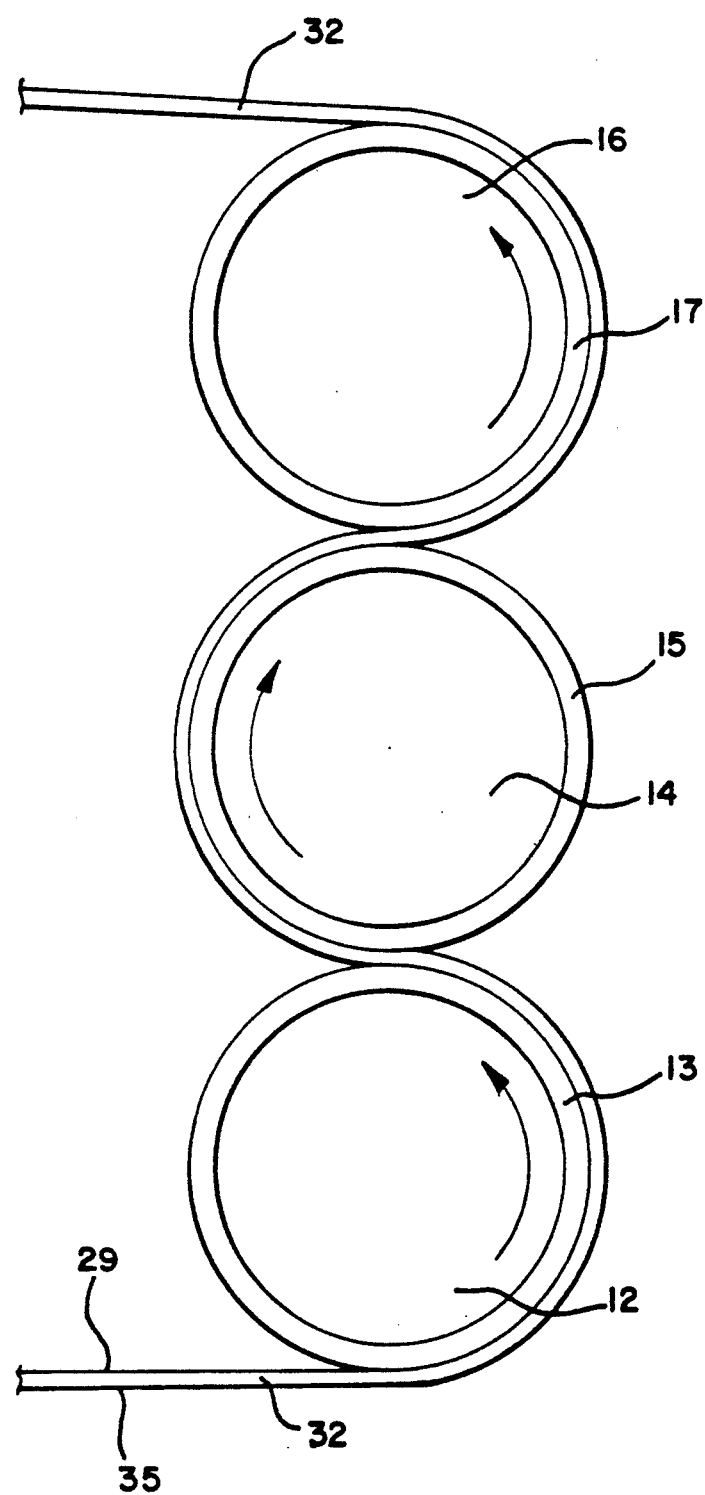

METHOD OF COMBINING ACTIVE INGREDIENTS WITH POLYVINYL ACETATES

RELATED APPLICATION

This application is a continuation-in-part of U.S. application Ser. No. 07/809,468, filed on Dec. 16, 1991 now U.S. Pat. No. 5,198,251, the entire disclosure of which is incorporated herein by reference. Ser. No. 07/809,468 is a continuation-in-part of Ser. No. 07/781,006, filed on Oct. 18, 1991 now U.S. Pat. No. 5,165,944 which is a continuation-in-part of Ser. No. 07/606,044, filed on Oct. 30, 1990 now U.S. Pat. No. 5,108,762, which is a continuation-in-part of Ser. No. 07/340,384, filed Apr. 18, 1989, now U.S. Pat. No. 4,978,537.

FIELD OF THE INVENTION

This invention relates to an improved method of combining chewing gum active ingredients such as flavor ingredients, flavor enhancing ingredients, high intensity sweeteners, or the like, with polyvinyl acetate. More specifically, the invention is concerned with reducing the time during which the active ingredients are exposed to high temperature following extrusion, thereby alleviating degradation of the active ingredients.

BACKGROUND OF THE INVENTION

When polyvinyl acetate is combined with active ingredients to form encapsulation mixtures or gradual release structures for use in chewing gum, the ingredients are conventionally mixed using an extruder, such as a Leistritz or Werner-Pfleiderer single screw or twin screw extruder. Initially, the granular polyvinyl acetate and active ingredient are added to the extruder and heated to a temperature of about 90° C. to about 110° C., causing the polyvinyl acetate to melt and flow freely. The active ingredient may be a flavor ingredient, a flavor enhancing ingredient, a high intensity sweetener, or otherwise. The active ingredient is caused to mix with the polyvinyl acetate as the screws of the extruder turn and convey. The mixture is then extruded through a die, such as a slot die, to form a sheet-like extrudate. The extrudate is cooled to a solid form before being melt spun (in the case of gradual release structures) and/or ground into powder.

The initial cooling of the encapsulation mixture or gradual release structure is conventionally accomplished using an air venturi. The air venturi is an apparatus which simply aspires upon the extrudate and uses the force of air to blow it into a cooling trough. Once in the cooling trough, the extrudate is further cooled in air.

The polyvinyl acetate has a high heat capacity and heat retention, and low thermal conductivity. Accordingly, some of the polyvinyl acetate tends to remain in the molten state long after the encapsulation mixture or gradual release structure leaves the extruder. The air venturi is particularly ineffective in cooling the polyvinyl acetate which is located away from the surface, and near the core, of the extrudate. This prolonged heat history can cause undesirable degradation of the active ingredient which is being encapsulated in the polyvinyl acetate.

Active ingredients which are particularly susceptible to degradation due to prolonged heat exposure include but are not limited to sweeteners, flavors, flavor enhancers, and high intensity sweeteners such as Magnasweet. Degradation of active ingredient results in loss of activity, whether it be flavor, flavor enhancing or sweetening effect. Degradation is evidenced by an undesirable brown discoloration of the extrudate, which is normally white in appearance.

French Patent No. 2,503,989 discloses a cooling tunnel for cooling a raw extruded product, notably chewing gum. After exiting the extrusion head, the rectilinear material is conveyed in the as-extruded state by a conveyor belt along a cooling tunnel. The cooling is accomplished by evacuating the air from the internal space of the tunnel and feeding air cooled by the evaporation system of a cooling circuit.

European Patent Application No. 0,191,980 discloses the cooling of chewing gum slabs by placing the gum slabs on a metal conveyor belt which is cooled from underneath. The reference also discloses the blowing of cool air onto the surface of the gum slabs using fans.

U.S. Pat. No. 2,224,430 discloses passing a chewing gum mass between a pair of cooperating rollers disposed so as to provide a forming space therebetween for forming the gum into sticks. The peripheral walls of the rollers are cooled using a refrigerant, in order to prevent the chewing gum from sticking to the rollers, and to cause solidification of the chewing gum.

There is a need in the chewing gum industry for a cooling method which significantly increases the rates of cooling for encapsulation mixtures and gradual release structures which utilize polyvinyl acetate as the encapsulant or wall material, thereby reducing the degradation of heat sensitive active ingredients contained therein.

SUMMARY OF THE INVENTION

The present invention is directed to an improved method of combining a chewing gum active ingredient with polyvinyl acetate. The polyvinyl acetate and active ingredient are mixed together in an extruder as explained in the foregoing background section to produce a mixture. The mixture exits the extruder through a die, preferably a slot die. Then, the extrudate is drawn between and around a series of at least three chilled compression rolls.

The compression rolls are arranged close enough together so that when the extruded mixture passes between two of the rolls, the mixture is simultaneously pressed against the surfaces of both adjacent rolls. The compression rolls are also arranged such that opposite surfaces of the extrudate each remain in contact with one of the rolls for a period of time following compression. Initially, the extrudate contacts a first chill roll and is pinched between first and second chilled rolls, causing compression. Then, a first surface of the extrudate remains in contact with the second chilled roll for a period of time. Then, the extrudate is pinched between second and third chilled rolls, again causing compression. Then, a second surface of the extrudate remains in contact with the third chilled roll for a period of time.

With the foregoing in mind, it is a feature and advantage of the invention to provide a method of combining a chewing gum active ingredient using polyvinyl acetate, during which the encapsulation mixture is swiftly and thoroughly cooled immediately following extrusion.

It is also a feature and advantage of the invention to provide an improved encapsulation mixture and gradual release structure of polyvinyl acetate and active ingredient, for use in chewing gum.

The foregoing and other features and advantages of the invention will become further apparent from the following detailed description of the presently preferred embodiments, taken in conjunction with the accompanying figures. It is understood that the detailed description and figures are to be construed as illustrative rather than limitative, the scope of the invention being defined by the appended claims and equivalents thereof.

BRIEF DESCRIPTION OF THE FIGURES

FIG. 1 is a front view of a chill roll assembly which can be used to practice the method of the invention.

FIG. 2 is a sectional view taken along the lines 2—2 of FIG. 1, and also illustrates the path of the extrudate not shown in FIG. 1.

DETAILED DESCRIPTION OF THE PRESENTLY PREFERRED EMBODIMENTS

Referring first to FIG. 1, a chilled compression roll assembly is shown and is generally designated as 10. The chilled compression roll assembly 10 includes a first compression roll 12, a second compression roll 14, and a third compression roll 16, all of which are rotatably yet firmly mounted to a stainless steel frame 18 by means of bearing assemblies 20, 22, 24, 26, 28 and 30.

Referring now to FIG. 2, the compression rolls 12, 14 and 16 are mounted close enough to each other so that when a typical extrudate 32 having a thickness of about 0.025 to about 0.040 inch passes between the rolls, the extrudate is pinched and compressed between the adjacent rolls. The minimum distance between the adjacent rolls (i.e., the minimum distance between rolls 12 and 14, and the minimum distance between rolls 14 and 16) is typically no greater than about 0.025 inch. Preferably, the minimum distance between adjacent rolls is no greater than about 0.020 inch, and most preferably the minimum distance between adjacent rolls is about 0.016 inch. Preferably, each chilled compression roll has an outer diameter of about five inches.

Referring again to FIG. 1, chilling fluid from a source 33 is supplied directly to the interiors of compression rolls 12 and 16 via supply lines 34 and 36, respectively. The chilling fluid can be city water which typically has an average temperature of about 40°–70° F., or can be chilled water, or can be a fluid other than water. The chilling fluid passes through the interior of compression rolls 12 and 16 and exits via passages 40 and 42, respectively.

Outlet passages 40 and 42 are in communication with an inlet passage 44 to compression roll 14, allowing chilling fluid which exits chilled rolls 12 and 16 to enter and pass through the compression roll 14. The chilling fluid exits the compression roll 14 via the passage 36 and enters a recirculating tank 48. The tank 48 is in communication with the supply lines 34 and 36 via passages 50 and 52, thereby completing the circuit. Some of the chilling fluid again passes into the compression rolls 12 and 16 via passages 50 and 52, while the remainder of the chilling fluid in the tank 48 is drained.

The chilling fluid should have a sufficiently low temperature and a sufficiently high flow rate that the temperatures in each of the compression rolls 12, 14 and 16 do not exceed about 75° F. Preferably, the temperatures in the compression rolls should be maintained below about 70° F., and most preferably below about 65° F.

The compression rolls themselves should be constructed of a material having a high thermal conductivity such that the cooling effects of the chilling fluid are easily transmitted to the outer surfaces in communication with the extrudate 32. Referring to FIG. 2, the walls 13, 15 and 17 of the compression rolls 12, 14 and 16 are preferably constructed of chromium coated steel or another material having similar thermal conductivity.

The thickness of the walls 13, 15 and 17 of the compression rolls also influences the coding effect. The wall thickness of a compression roll constructed of chromium coated steel should not exceed about 0.375 inch, and should preferably be about 0.25 inch. Compression rolls suitable for practicing the invention are available from Killion Extruders, Inc. of Ceda Grove, N.J. Preferably, the compression rolls 12, 14 and 16 are coated with chromium in order to prevent sticking of the extrudate 32 to the compression rolls. Preferably, the first compression roll 12 is positioned about 2 to 3 inches from the slot die end of the extruder (not shown). Preferably, the compression rolls are mounted vertically with respect to each other, as shown in FIGS. 1 and 2.

The compression rolls 12, 14 and 16 each rotate in a direction opposite to the direction of rotation of each adjacent compression roll. From the viewpoint of FIG. 2, the first compression roll 12 and the third compression roll 16 rotate counter-clockwise, while the second (center) compression roll 14 rotates in a clockwise direction. Referring to FIG. 1, all three compression rolls are driven by a single motor and gear assembly 54, which transmits rotation to the compression rolls via drive shafts 56, 58, 60, 62 and 64.

Referring now to FIG. 2, the method of the invention effects a swift and thorough cooling to the extrudate 32 as follows. The extrudate 32 leaves the die slot (not shown) and a first surface 29 of the extrudate immediately contacts the first chilled compression roll 12. The extrudate 32 winds about halfway around the compression roll 12 with its first surface 29 being in constant contact with the chilled compression roll.

Then, the extrudate 32 is pinched between the first compression roll 12 and the second compression roll 14. This pinching enhances the cooling of the extrudate 32 by compressing the extrudate thereby exposing greater surface area of the extrudate to the chilled rolls. The pinching also enhances the cooling by pulling the trailing portions of the extrudate 32 securely against the first chill roll 12, almost immediately after the extrudate 32 exits the die slot.

After being pinched and compressed between the first and second compression rolls 12 and 14, the extrudate 32 winds about halfway around the second compression roll 14. During this time, the second surface 35 of the extrudate 32 is in constant contact with the chilled compression roll 14. Thus, the extrudate 32 is thoroughly cooled from both sides—first, with surface 29 in contact with the chilled compression roll 12, and second, with surface 35 in contact with the chilled compression roll 14.

After traveling halfway around the second compression roll 14, the extrudate 32 is again pinched, this time between the second and third compression rolls 14 and 16. The extrudate 32 then travels about halfway around the third compression roll 16, with the first surface 29 in contact with the third compression roll 16. After leaving the third compression roll 16, the extrudate 32 passes through another roller assembly, not shown, which consists of two rolls covered with rubber or plastic which are not chilled. The last two rolls pinch and pull the extrudate to help maintain tension in the extrudate, and direct the extrudate to a collection bin.

The method of the invention is useful for manufacturing any polyvinyl acetate encapsulated active ingredient, and is particularly useful when the active ingredient is sensitive to prolonged exposure to high temperature.

The method of the invention is contemplated for use in the production of any encapsulation matrix or gradual release structure which utilizes polyvinyl acetate as the wall material and which contains more than zero but less than about 55 weight percent active ingredient, preferably about 10 to about 55 weight per cent active ingredient. The method contemplates that the active agent and polyvinyl acetate will be mixed together when the polyvinyl acetate is in the molten state. Preferably, the components will be mixed using an extruder, and the encapsulation mixture will be extruded through a slot die, so that the extrudate is in the form of a sheet. An example of a slot die useful with the method of the invention is a die which has a 1 inch by 150 inch, substantially rectangular opening.

The active ingredient can be any material such as artificial sweeteners, flavoring agents, flavor enhancing agents, or drugs, of which the slow or delayed release may be desired. The active ingredient should be solid or in the form of powders, including liquids encapsulated by spray drying techniques or liquids adsorbed or absorbed into or onto a supporting material such as silica, zeolite, carbon black, or porous matrices. Combinations of different active agents in the same structure may also be employed.

For purposes of illustration, possible active ingredients may be: high intensity sweeteners, such as Aspartame, Alitame, Acesulfame-k and its salts, saccharin and its salts, Thaumatin, Sucralose, Cyclamic acid and its salts, Monellin, and Dihydrochalcones; acidulants, such as malic acid, citric acid, tartaric acid, and fumaric acid; salt, such as sodium chloride and potassium chloride; bases, such as, magnesium hydroxide and urea; flavors, such as spray dried natural or synthetic adsorbed onto silica, and absorbed into maltodextrin; flavor modifiers, such as Thaumatin; breath fresheners, such as zinc chloride, encapsulated menthol, encapsulated anise, zinc glucinate, and encapsulated chlorophyll; glycyrrhizins, including glycyrrhizic acid or salts (food grade) thereof, one such commercially available compound called Magnasweet 135 is manufactured by MacAndrew and Forbes, Camden, N.J., these compounds may be combined with a sugar; and medicaments.

Of the various types of high intensity sweeteners, glycyrrhizins, such as Magnasweet 135, show surprisingly good results when combined with wall such as PVAc. When using Magnasweet 135, the occurrence of "off notes" (a residual taste of licorice) can be avoided by combining the product with a sugar. Furthermore, Magnasweet 135 can be used to form a gradual release structure, by combining it with a wall material such as PVAc and a sugar and heating the mixture in the temperature range of 140°-160° C. The resulting material can the be ground and exhibits gradual release characteristics.

While any commercially available polyvinyl acetate may be used as the wall material, it is preferred that the polyvinyl acetate have an average molecular weight of about 40,000 to about 100,000, most preferably about 52,000. It is believed that polyvinyl acetate having a molecular weight greater than about 100,000 will have less tendency to exhibit gradual release by deformation during chewing.

By way of example, combinations of polyvinyl acetate and active ingredients having the following compositions can be produced according to the method of the invention. Percentages are given by weight.

(1) 75% PVAc having a molecular weight of about 50,000–80,000 as the wall material and 25% Acesulfame-k as the active agent, extruded at a temperature of about 90°–100° C.;

(2) 47.26% PVAc having a molecular weight of about 30,000 and 37.81% PVAc having a molecular weight of about 15,000 as the wall material and 37.81% sucrose, 9.45% Magnasweet 135, and 0.50% Magnesium Stearate as the active agent, extruded at a temperature of about 90°–95° C.;

(3) 75% PVAc having a molecular weight of about 50,000–80,000 as the wall material and 25% finely ground salt as the active agent, extruded at a temperature of about 100°–110° C.;

(4) 75% PVAc having a molecular weight of about 30,000 as the wall material and 25% Acesulfame-k as the active agent, extruded at a temperature of about 90°–100° C.;

(5) 74.6% PVAc having a molecular weight of about 50,000–80,000 as the wall material and 13.8% Magnasweet 135, 11.1% finely qround salt, and 0.5% Magnesium Stearate as the active agent, extruded at a temperature of about 95°–100° C.;

(6) 75% PVAc having a molecular weight of about 50,000–80,000 as the wall material and 15% Magnasweet 135 and 10% sugar as the active agent, extruded at a temperature of about 100° C.;

(7) 99.5% (a mixture of 74.6% PVAc having a molecular weight of about 50,000–80,000 as the wall material and 13.8% Magnasweet 135, 11.1% finely ground salt, and 0.5% Magnesium Stearate as the active agent) and 0.5% fumed silica, extruded at a temperature of about 100° C.;

(8) 99.5% (a mixture of 75% PVAc having a molecular weight of about 50,000–80,000 as the wall material and 15% Magnasweet 135 and 10% sugar as the active agent) and 0.5% fumed silica, extruded at a temperature of about 100° C.;

(9) 83% PVAc having a molecular weight at about 50,000–80,000 as the wall material and 17% L-aspartyl-L-phenylanaline methyl ester (Aspartame) as the active agent, extruded at a temperature of about 100° C.;

(10) 71% PVAc having a molecular weight of about 50,000–80,000 as the wall material and 29% Aspartame as the active agent, extruded at a temperature of about 100° C.;

(11) 65% PVAc having a molecular weight of about 50,000–80,000 as the wall material and 35% Aspartame as the active agent, extruded at a temperature of about 100° C.;

(12) 90% PVAc having a molecular weight of about 50,000–80,000 as the wall material and 10% Acesulfame-k as the active agent, extruded at a temperature of about 110°–115° C.;

(13) 75% PVAc having a molecular weight of about 50,000–80,000 as the wall material and 25% Acesulfame-k as the active agent, extruded at a temperature of about 110°–115° C.;

(14) 65% PVAc having a molecular weight of about 50,000–80,000 as the wall material and 35% sodium saccharin as the active agent, extruded at a temperature of about 100° C.;

(15) 90% PVAc having a molecular weight of about 30,000 as the wall material, and 6.13% sodium chloride and 3.87% potassium chloride as active agents, extruded at a temperature of about 110°-115° C.;

(16) 90% PVAc having a molecular weight of about 15,000 as the wall material, and 6.13% sodium chloride and 3.87% potassium chloride as active agents, extruded at a temperature of about 90° C.;

(17) 75% PVAc having a molecular weight of about 50,000-80,000 as the wall material and 25% diammonium phosphate as the active agent, extruded at a temperature of about 100° C.;

(18) 75% PVAc having a molecular weight of about 50,000-80,000 as the wall material and 25% sodium fluoride as the active agent, extruded at a temperature of about 90°-100° C.;

(19) 75% PVAc having a molecular weight of about 50,000-80,000 as the wall material and 25% by weight magnesium hydroxide as the active agent, extruded at a temperature of about 90°-100° C.;

(20) 50% PVAc having a molecular weight of about 30,000 as the wall material, and 10% Magnasweet 135 and 40% sugar as active agents, extruded at a temperature of about 80°-100° C.;

(21) 45% PVAc with a molecular weight of about 30,000 and 10% PVAc with a molecular weight of about 50,000-80,000 as the wall material, and 9% Magnasweet 135 and 36% sugar as active agents, extruded at a temperature of about 90°-100° C.;

(22) 60% PVAc with a molecular weight of about 30,000 as the wall material, and 10% Magnasweet 135 and 30% sugar as active agents, extruded at a temperature of about 90°-100° C.;

(23) 70% PVAc with a molecular weight of about 50,000-80,000 as the wall material, and 10% Magnasweet 135 and 20% sugar as active agents, extruded at a temperature of about 90°-100° C.; and

(24) 47.5% PVAc with a molecular weight of about 30,000 and 5% PVAc with a molecular weight of about 50,000-80,000 as the wall material, and 9.5% Magnasweet 135 and 38% sugar as active agents, extruded at a temperature of about 80°-100° C.

The gradual release structures and encapsulation mixtures produced according to the invention can be used in chewing gum. A chewing gum composition generally includes a water soluble bulk portion, a water insoluble chewing gum base portion and one or more flavoring agents. The water soluble portion dissipates over a period of time during chewing. The gum base portion is retained in the mouth throughout the chewing phase.

The insoluble gum base generally includes elastomers, resins, fats, oils, waxes, softeners and inorganic fillers. The elastomers may include polyisobutylene, isobutylene-isoprene copolymer, styrene butadiene rubber and natural latexes such as chicle. The resins may include polyvinyl acetate and terpene resins. Low molecular weight polyvinyl acetate is a preferred resin. Fats and oils may include animal fats such as lard and tallow, vegetable oils such as soybean and cottonseed oils, hydrogenated and partially hydrogenated vegetable oils, and cocoa butter. Commonly used waxes include petroleum waxes such as paraffin and microcrystalline wax, natural waxes such as beeswax, candellia, carnauba and polyethylene wax. The present invention contemplates the use of any commercially acceptable chewing gum base.

The gum base typically also includes a filler component such as calcium carbonate, magnesium carbonate, talc, dicalcium phosphate and the like; softeners, including glycerol monostearate and glycerol triacetate; and optional ingredients such as antioxidants, colors and emulsifiers. The gum base constitutes between 5-95% by weight of the chewing gum composition, more typically 10-50% by weight of the chewing gum, and most commonly 20-30% by weight of the chewing gum.

The water soluble portion of the chewing gum may include softeners, bulk sweeteners, high intensity sweeteners, flavoring agents and combinations thereof. Softeners are added to the chewing gum in order to optimize the chewability and mouth feel of the gum. The softeners, which are also known as plasticizers or plasticizing agents, generally constitute between about 0.5-15% by weight of the chewing gum. The softeners may include glycerin, lecithin, and combinations thereof. Aqueous sweetener solutions such as those containing sorbitol, hydrogenated starch hydrolysates, corn syrup and combinations thereof, may also be used as softeners and binding agents in chewing gum.

Bulk sweeteners constitute between 5-95% by weight of the chewing gum, more typically 20-80% by weight of the chewing gum and most commonly 30-60% by weight of the chewing gum. Bulk sweeteners may include both sugar and sugarless sweeteners and components. Sugar sweeteners may include saccharide containing components including but not limited to sucrose, dextrose, maltose, dextrin, dried invert sugar, fructose, levulose, galactose, corn syrup solids, and the like, alone or in combination. Sugarless sweeteners include components with sweetening characteristics but are devoid of the commonly known sugars. Sugarless sweeteners include but are not limited to sugar alcohols such as sorbitol, mannitol, xylitol, hydrogenated starch hydrolysates, maltitol, and the like, alone or in combination.

High intensity sweeteners may also be present and are commonly used with sugarless sweeteners. When used, high intensity sweeteners typically constitute between 0.001-5% by weight of the chewing gum, preferably between 0.01-1% by weight of the chewing gum. Typically, high intensity sweeteners are at least 20 times sweeter than sucrose. These may include but are not limited to sucralose, aspartame, salts of acesulfame, alitame, saccharin and its salts, cyclamic acid and its salts, glycyrrhizin, dihydrochalcones, thaumatin, monellin, and the like, alone or in combination.

Combinations of sugar and/or sugarless sweeteners may be used in chewing gum. The sweetener may also function in the chewing gum in whole or in part as a water soluble bulking agent. Additionally, the softener may also provide additional sweetness such as with aqueous sugar or alditol solutions.

Flavoring agents should generally be present in the chewing gum in an amount within the range of about 0.1-15% by weight of the chewing gum, preferably between about 0.2-5% by weight of the chewing gum, most preferably between about 0.5-3% by weight of the chewing gum. As previously indicated, flavoring agents may include essential oils, synthetic flavors or mixtures thereof including but not limited to oils derived from plants and fruits such as citrus oils, fruit essences, peppermint oil, spearmint oil, other mint oils, clove oil, oil of wintergreen, anise and the like. Artificial flavoring agents and components may also be used in the flavor ingredient of the invention. Natural and artificial flavoring agents may be combined in any sensorially acceptable fashion.

Optional ingredients such as colors, emulsifiers, pharmaceutical agents and additional flavoring agents may also be included in chewing gum.

Chewing gum is generally manufactured by sequentially adding the various chewing gum ingredients to any commercially available mixer known in the art. After the ingredients have been thoroughly mixed, the gum mass is discharged from the mixer and shaped into the desired form such as by rolling into sheets and cutting into sticks, extruding into chunks, or casting into pellets. Generally, the ingredients are mixed by first melting the gum base and adding it to the running mixer. The gum base may alternatively be melted in the mixer. Color and emulsifiers can be added at this time.

A softener such as glycerin can be added next along with syrup and part of the bulk portion. Further parts of the bulk portion may then be added to the mixer. Flavoring agents and optional flavor enhancing agents are typically added with the final part of the bulk portion. The entire mixing process typically takes about fifteen minutes, although longer mixing times are sometimes required. Those skilled in the art will recognize that variations of this mixing procedure, or other mixing procedures, may be followed.

While the embodiments of the invention disclosed herein are at present considered to be preferred, various modifications and improvements can be made without departing from the spirit and scope of the invention. The scope of the invention is indicated in the appended claims, and all changes which come within the meaning and range of equivalency of the claims are intended to be embraced therein.

We claim:

1. An improved method of preparing encapsulation mixtures and gradual release structures for use in chewing gum, comprising the steps of:
   feeding polyvinyl acetate to an extruder, at a first rate;
   feeding one or more active ingredients to the extruder, at a second rate;
   heating the polyvinyl acetate and active ingredient in the extruder to a temperature of about 90° C. to about 110° C.;
   mixing the polyvinyl acetate and active ingredient in the extruder to form a mixture;
   the first and second rates being selected such that the mixture contains more than zero but less than about 55 weight per cent active ingredient;
   extruding the mixture through a die, to form a sheet-like extrudate;
   contacting a first surface of the extrudate only with a first chilled compression roll;
   pinching the extrudate between the first and a second chilled compression roll;
   contacting a second surface of the extrudate only with a second chilled compression roll;
   pinching the extrudate between the second and a third chilled compression roll; and
   contacting the first surface of the extrudate only with the third chilled compression roll.

2. The method of claim 1, wherein the first chilled compression roll rotates continuously, and the first surface of the extrudate maintains contact with the first chilled compression roll during rotation for about half of one revolution.

3. The method of claim 2, wherein the second chilled compression roll rotates continuously, and the second surface of the extrudate maintains contact with the second chilled compression roll during rotation for about half of one revolution.

4. The method of claim 3, wherein the third chilled compression roll rotates continuously, and the first surface of the extrudate maintains contact with the third chilled compression roll during rotation for about half of one revolution.

5. The method of claim 1, wherein the minimum distance between the first and second compression rolls and the minimum distance between the second and third compression rolls are each no greater than about 0.025 inch.

6. The method of claim 1, wherein the minimum distance between the first and second chilled compression rolls and the minimum distance between the second and third chilled compression rolls are each no greater than about 0.020 inch.

7. The method of claim 1, wherein the minimum distance between the first and second chilled compression rolls and the minimum distance between the second and third chilled compression rolls are each about 0.16 inch.

8. The method of claim 1, wherein the chilled compression rolls are constructed of a material comprising chromium coated steel.

9. The method of claim 1, wherein the first, second and third chilled compression rolls are cooled by providing chilling fluid to the respective interiors of the first, second and third compression rolls.

10. The method of claim 9, wherein the chilling fluid comprises water having an average temperature of about 40° F. to about 70° F.

11. The method of claim 9, wherein the interiors of the first, second third chilled compression rolls have a temperature which does not exceed about 75° F.

12. The method of claim 9, wherein the interiors of the first, second and third chilled compression rolls have a temperature which does not exceed about 70° F.

13. The method of claim 9, wherein the interiors of the first, second and third chilled compression rolls have a temperature which does not exceed about 65° F.

14. The method of claim 8, wherein each of the first, second and third compression rolls has a wall thickness of about 0.25 inch.

15. An encapsulation mixture prepared according to the method of claim 1.

16. The encapsulation mixture of claim 15 in a chewing gum.

17. A gradual release structure prepared according to the method of claim 1.

18. The gradual release structure of claim 17 in a chewing gum.

19. An improved method of preparing encapsulation mixtures and gradual release structures for use in chewing gum, comprising the steps of:
   heating and mixing polyvinyl acetate and an active ingredient in an extruder in such quantities that the resulting mixture includes bout 10 to about 55 weight per cent active ingredient;
   extruding the mixture through a slot die, to form a sheet-like extrudate;
   providing a series of three chilled compression rolls in the vicinity of the slot die, each compression roll being rotatably mounted and spaced apart from an adjacent compression roll at a minimum distance not greater than about 0.025 inch;

chilling the compression rolls to a temperature below about 75° F.; and cooling the extrudate by placing the extrudate in contact, sequentially, with all three of the chilled compression rolls individually.

20. The method of claim 19, wherein the chilled compression rolls are vertically mounted with respect to each other.

21. The method of claim 19, wherein the chilled compression rolls are constructed from a material comprising chromium coated steel.

22. The method of claim 19, herein the slot die has a substantially rectangular opening with dimensions of about one inch by about 0.125 inch.

23. The method of claim 19, further comprising the step of pinching the extrudate between two of the chilled compression rolls.

24. The method of claim 19, wherein each chilled compression roll has an outer diameter of about five inches.

25. The method of claim 19, wherein each chilled compression roll has a chromium coating.

26. An encapsulation mixture prepared according to the method of claim 19.

27. The encapsulation mixture of claim 26 in a chewing gum.

28. A gradual release structure prepared according to the method of claim 19.

29. The gradual release structure of claim 28 in a chewing gum.

* * * * *

UNITED STATES PATENT AND TRADEMARK OFFICE
CERTIFICATE OF CORRECTION

PATENT NO. : 5,229,148
DATED : July 20, 1993
INVENTOR(S) : Charles M. Copper

It is certified that error appears in the above-identified patent and that said Letters Patent is hereby corrected as shown below:

Column 5, line 22, delete "150 inch" and substitute --1/8 inch--.

Column 5, line 62, delete "the" and substitute --then--.

Column 6, line 29, delete "qround" and substitute --ground--.

<u>IN THE CLAIMS</u>

Col.10 Claim 11, line 39, after "second" insert --and--.

Claim 19, line 63, delete "bout" and substitute --about--.

Col. 11 Claim 22, line 15, delete "herein" and substitute --wherein--.

Signed and Sealed this

Sixth Day of September, 1994

Attest:

BRUCE LEHMAN

Attesting Officer   Commissioner of Patents and Trademarks